(12) United States Patent
Lonial et al.

(10) Patent No.: US 11,922,140 B2
(45) Date of Patent: Mar. 5, 2024

(54) PLATFORM FOR INTEGRATING BACK-END DATA ANALYSIS TOOLS USING SCHEMA

(71) Applicant: ORACLE INTERNATIONAL CORPORATION, Redwood Shores, CA (US)

(72) Inventors: Sandhya Lonial, North Andover, MA (US); Sajith Vijayan, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 425 days.

(21) Appl. No.: 16/840,607

(22) Filed: Apr. 6, 2020

(65) Prior Publication Data
US 2020/0319857 A1 Oct. 8, 2020

Related U.S. Application Data

(60) Provisional application No. 62/830,055, filed on Apr. 5, 2019.

(51) Int. Cl.
*G06F 8/34* (2018.01)
*G06F 3/0482* (2013.01)
*G06F 16/21* (2019.01)

(52) U.S. Cl.
CPC .............. *G06F 8/34* (2013.01); *G06F 3/0482* (2013.01); *G06F 16/212* (2019.01)

(58) Field of Classification Search
CPC ......... G06F 8/34; G06F 3/0482; G06F 16/212
See application file for complete search history.

(56) References Cited

U.S. PATENT DOCUMENTS 7,849,048 B2 * 12/2010 Langseth .............. G06F 16/254
   707/602
9,317,542 B2 * 4/2016 Agarwal ................. G06F 16/00
(Continued)

OTHER PUBLICATIONS

Sabbah, T., Rashid Jayousi, and Yousef Abuzir. "Schema matching using thesaurus." Proceeding of 3rd International Conference on Software, Knowledge, Information Management and Applications. 2009. (Year: 2009).*

(Continued)

*Primary Examiner* — Matthew J Brophy
(74) *Attorney, Agent, or Firm* — Kraguljac Law Group, LLC

(57) ABSTRACT

In one embodiment of systems and methods described herein, a computing device is configured to generate and display a user interface including one or more selectable generic options; receive a selection of a data analysis function to perform machine learning; translate the selected function into pre-configured commands for each back-end tool that are specific to each back-end tool for performing the selected function, wherein the pre-configured commands identify and access specific schema with a compatible format for reading the specific schema from each back end tool to expose retail-specific data sets in accordance with the specific schema; execute the preconfigured commands based on the specific schema and retrieve corresponding retail-specific data from a plurality of the back-end tools based on the specific schema; and execute the selected data analysis function on the retrieved retail-specific data from the plurality of back-end tools and generate a data analysis result using Artificial Intelligence-Enabled infrastructure.

20 Claims, 8 Drawing Sheets

(56) References Cited

U.S. PATENT DOCUMENTS

| | | | |
|---|---|---|---|
| 9,361,323 B2* | 6/2016 | Agarwal | G06F 16/211 |
| 9,390,395 B2* | 7/2016 | Chatterjee | G06Q 10/10 |
| 9,679,006 B2* | 6/2017 | Wright | G06F 16/9538 |
| 9,978,021 B2* | 5/2018 | Hoover | G06N 5/045 |
| 10,379,995 B1* | 8/2019 | Walters | G06F 16/283 |
| 10,452,444 B1* | 10/2019 | Jibaja | G06F 3/0665 |
| 10,853,356 B1* | 12/2020 | McPherson | G06F 16/24 |
| 10,853,385 B1* | 12/2020 | Truong | G06F 16/1794 |
| 11,527,058 B2* | 12/2022 | Lin | G06F 17/18 |
| 2005/0021541 A1* | 1/2005 | Rangadass | G06Q 10/10 |
| 2007/0011134 A1* | 1/2007 | Langseth | G06F 16/254 |
| 2013/0086116 A1* | 4/2013 | Agarwal | G06F 16/211 |
| | | | 707/792 |
| 2013/0254237 A1* | 9/2013 | Agarwal | G06F 16/00 |
| | | | 707/792 |
| 2014/0122412 A1* | 5/2014 | Bandekar | G06F 16/254 |
| | | | 707/602 |
| 2016/0117623 A1* | 4/2016 | Hoover | G06F 3/0481 |
| | | | 705/7.28 |
| 2016/0335291 A1* | 11/2016 | Schnase | G06F 16/182 |
| 2017/0006135 A1* | 1/2017 | Siebel | G06Q 10/06 |
| 2017/0220681 A1* | 8/2017 | Daas | G06F 40/186 |
| 2017/0277708 A1* | 9/2017 | Sarangi | G06F 16/215 |
| 2017/0315791 A1* | 11/2017 | Mascaro | G06F 8/36 |
| 2018/0285389 A1* | 10/2018 | Maurya | G06F 16/258 |
| 2019/0012316 A1* | 1/2019 | Bahrie | G06F 16/26 |
| 2019/0056918 A1* | 2/2019 | Langdon | G06F 8/44 |
| 2019/0146998 A1* | 5/2019 | Jin | G06F 9/4881 |
| | | | 718/104 |
| 2019/0243836 A1* | 8/2019 | Nanda | G06F 16/258 |
| 2019/0354708 A1* | 11/2019 | Fisher | G06F 16/212 |
| 2020/0089664 A1* | 3/2020 | Russell | G06F 16/213 |
| 2020/0117756 A1* | 4/2020 | Garimella | G06F 16/9566 |
| 2020/0125404 A1* | 4/2020 | Klein | G06F 9/54 |
| 2020/0319857 A1* | 10/2020 | Lonial | G06F 3/0482 |
| 2020/0387387 A1* | 12/2020 | Iijima | G06F 8/36 |
| 2021/0133163 A1* | 5/2021 | Fry | G06F 8/44 |
| 2021/0133202 A1* | 5/2021 | Fry | G06F 11/3006 |
| 2021/0141838 A1* | 5/2021 | Atallah | G06F 16/9577 |
| 2021/0209168 A1* | 7/2021 | Oswald | G06F 40/47 |
| 2021/0398012 A1* | 12/2021 | Novotny | G06F 16/2465 |

OTHER PUBLICATIONS

Setchi, Rossitza, and Obokhai K. Asikhia. "Exploring user experience with image schemas, sentiments, and semantics." IEEE Transactions on Affective Computing 10.2 (2017): 182-195. (Year: 2017).*

Judith Mescell / Oracle; Oracle® Retail Advanced Science Cloud Services, Implementation Guide, Release 16.0.202, E88882-01; Aug. 2017, pp. 1-25, Oracle International, Redwood Shores, CA.

Judith Mescell / Oracle; Oracle@ Retail Advanced Science Cloud Services, User Guide, Release 16.0.202 E88780-01; Aug. 2017, pp. 1-9, Oracle International, Redwood Shores, CA.

Judith Mescell et al. / Oracle; Oracle® Retail Advanced Science Cloud Services, Implementation Guide, Release 17.0; E95345-03; May 2018, pp. 1-77, Oracle International, Redwood Shores, CA.

Judith Mescell / Oracle; Oracle@ Retail Advanced Science Cloud Services, Administration Guide, Release 16.0.202, E88781-01; Aug. 2017, pp. 1-7, Oracle International, Redwood Shores, CA.

* cited by examiner

PLATFORM FOR INTEGRATING BACK-END DATA ANALYSIS TOOLS USING SCHEMA

CROSS REFERENCE TO RELATED APPLICATIONS

This disclosure claims the benefit of U.S. Provisional Patent Application Ser. No. "62/830,055" filed Apr. 5, 2019, titled "Artificial Intelligence (AI) Platform for Retail", inventors: Sandhya Lonial and Sajith Vijayan, and assigned to the present assignee, which is incorporated by reference herein in its entirety.

BACKGROUND

Organizations collect large amounts of structured and unstructured data regarding various activities of the organization such as sales, marketing, customer behavior, and other factors affecting the organization. Analysis of such data is a powerful tool for driving decision-making. New analyses of existing data require the construction of custom applications or extensions to existing applications, which is a labor-intensive process. Previously, construction of custom applications required engagement by third-party software developers, vendors or consultants to perform the work, thus increasing miscommunication and possible incorrect functionality being implemented as well as increasing total cost. Also previously, the labor involved imposed a significant delay between the time a new analysis is conceived and then implemented.

Over time, an organization generates many custom applications and data analysis tools. Each application and tool is accessed and operated with unique commands and manages particular datasets. An unintended consequence occurs in that it becomes very difficult for any user to develop the skill and knowledge needed to operate the many custom applications and tools. It is also difficult if not impossible for any user to know what type of data exists or even know how to access particular data when the data is hidden and managed by different applications in different locations.

If a new custom tool or application was desired, such as by combining functions from two or more separate data analysis tools, a system did not exist to perform this. Rather, the custom tool would have to be programmed by developers. Alternately, if the two separate data analysis tools were requested to execute on the same dataset, this was either not possible in many organizations or required multiple sequential steps to execute each tool separately, create intermediate results, and perform the remaining analysis functions. This technique, of course, required a high degree of skill and knowledge about the functionality of the tools and typically resulted in incorrect results.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods associated with implementing a platform for integrating multiple back-end analysis tools using schema are described herein. In one embodiment, the platform for integrating the back-end analysis tools is a service offered on a cloud computing system (for example, the Oracle Retail Cloud) that enables users to rapidly assemble functions from multiple separate tools and data to curate data, discover hidden patterns in data, and rapidly build analytical applications that are directed to selected retail-related data. The built analytical applications are highly scalable and readily integrate with enterprise applications.

The present system makes it easy to build intelligent, cloud-based applications. In one embodiment, the platform for integrating back-end retail analysis tools is an inclusive technology stack that provides preselected and preconfigured data science tools to develop and deploy analytic applications from a group of independent applications. For example, the platform may include pre-configured access to data science tools included in Oracle Advanced Analytics, Oracle APEX, Oracle Rest Data Services, Oracle Database, and Oracle Big Data/Hadoop. In one embodiment, the platform also supports parallelized in-database implementations of data mining algorithms, and integration with open source R statistical analysis language. In one embodiment, the platform includes a collaborative notebook-style user interface for data scientists to perform machine learning using Python, SQL, and PL/SQL language.

The present platform thus offers self-service tools that enable data scientists to employ a broad range of analyses, including the latest artificial intelligence advancements, without requiring specialized programming skills. An organization can take advantage of the present platform's capability to integrate a comprehensive set of services, infrastructure, and built-in advanced analytics tools to make AI-powered experiences. The user of the platform can have the data system ingest additional data, use interactive visualization to discover trends and patterns, build models and applications using advanced analytics tools, collaborate during development, and share results using REST services.

The present platform enables the use of ensemble methods combining multiple learning algorithms or other data processing tools, and to apply them to intermediate, cleansed, or bundled data without requiring specialized knowledge by the user and without requiring reconstruction of various siloed systems.

Example System

Figure 1:
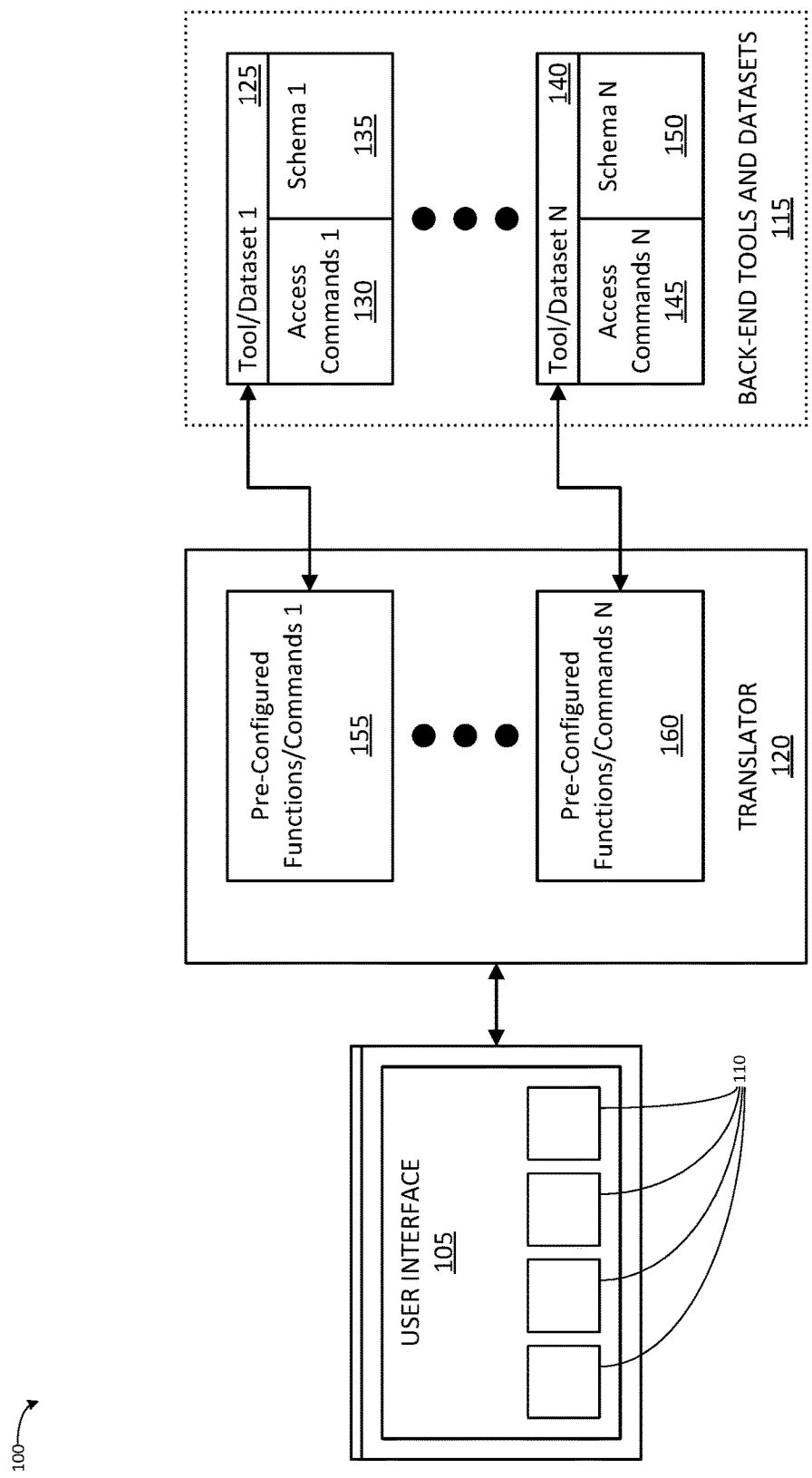
FIG. 1 illustrates one embodiment of a system associated with schema-based integration of back-end data analysis tools.

FIG. 1 illustrates one embodiment of a system 100 associated with schema-based integration of back-end data analysis tools. In one embodiment, the system 100 includes a user interface 105 such as a graphical user interface (GUI) for receiving user selections of one or more selectable generic options 110 or other user inputs. The system 100 also includes a set of back-end tools and datasets 115, and a translator 120 for identifying and accessing specific schema from the back-end tools and datasets 115 in response to user selection of a selectable generic option 110. (For convenience, back-end tools and datasets may occasionally be referred to herein simply as back-end tools.)

Figure 8:
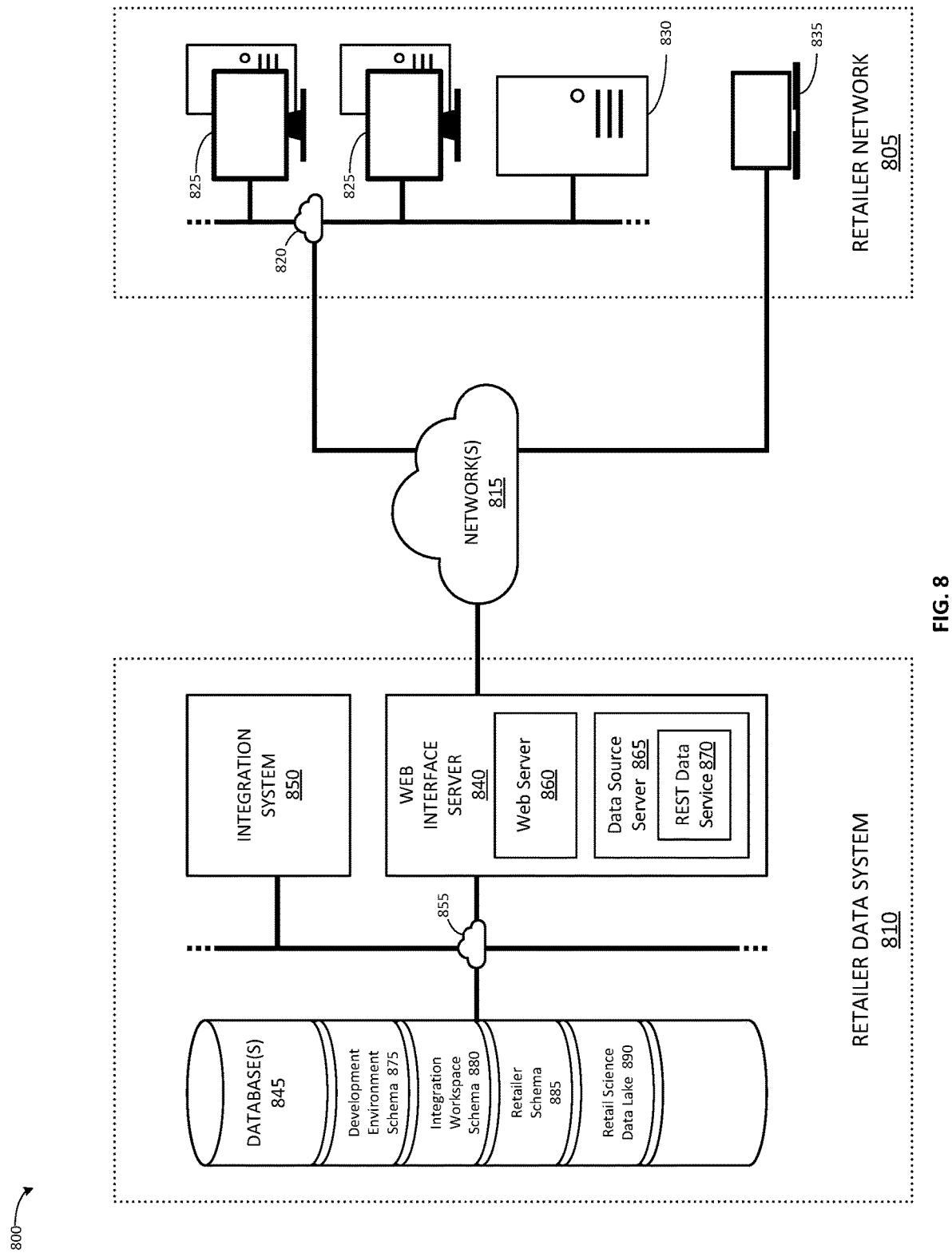
FIG. 8 illustrates one embodiment of a computing environment associated with schema-based integration of back-end data analysis tools.

In one embodiment, the selectable generic options 110 indicate various functions of a retailer data system (such as retailer data system 810 as shown and described with respect to FIG. 8) that may be selected by the user for use or integration with other functions. For example, the selectable generic options may include a selectable data analysis function.

In one embodiment, the back-end tools and datasets 115 include N different back-end tools and datasets, each with its own specific access commands or schema. For example, first tool/dataset 125 uses first access commands 130 and first schema 135 to access functions and data associated with first tool/dataset 125; and Nth tool/dataset 140 uses Nth access commands 145 and Nth schema 150 to access functions and data associated with Nth tool/dataset 140. The various back-end tools and datasets 115 each include retail-specific datasets, which may make up some or all of the including tool or dataset. Other data in the including tool or data set may have no relevance to retail processes. Specific access commands and/or schema locations are employed in order to expose and retrieve this retail-specific information, and these access commands and schema locations differ from those used to retrieve other information. However, access commands and schema locations of retail-specific data may be hidden from or forbidden to the user, for example to maintain database security and integrity.

For each tool, the system includes pre-configured access functions that identifies and accesses schema for the specific tool to expose corresponding retail-specific data sets that are part of the tool. Accordingly, in one embodiment, translator 120 translates the selected analysis functions to specific, pre-configured access functions or commands for the particular back-end tools and datasets 115. These pre-configured access functions or commands are specific to a particular back-end tool or dataset. For example, first pre-configured functions or commands 155 is specific to first tool/dataset 125, and Nth pre-configured functions or commands 160 is specific to Nth tool/dataset 140. The translator 120 identifies the selected option 110 and implements the appropriate pre-configured functions.

The retail-specific datasets vary among the various back-end tools and datasets 115. For example, the schema of intermediate and final results supporting operation of a customer segmentation analysis tool and the schema of intermediate and final results supporting operation of a return logistics tool each include different subsets of information relevant to retail, as well as information that is simply not relevant to retail analyses. The form of the schema, the locations within the schema of retail-specific data, and the data types of the retail specific data necessarily vary between the two types of tools. The pre-configured commands are pre-configured to access the particular set of retail-specific locations within the schema for the associated tool. When executed for a particular back-end tool or database, the pre-configured access function exposes and/or retrieves from the back-end tool or database the retail-specific datasets particular to that back-end tool or database. Thus, for example, the pre-configured function associated with the customer segmentation analysis tool exposes and retrieves data from the locations that are retail-specific within the schema associated with the customer segmentation analysis tool, while the pre-configured function associated with the return logistics tool exposes and retrieves data from the locations that are retail-specific within the schema associated with the return logistics tool.

The pre-configured function makes the retail-specific dataset available to use within the user-interface 105. In one embodiment, the translator creates a schema containing synonyms for the fields of the retail-specific dataset. Moreover, operation of all the pre-configured functions makes the entire set of all retail-specific datasets available for use within the user interface. Through the use of the translator 120, the retail-specific datasets are made available within the user interface 105 without requiring that the user know how to identify and locate retail-specific data in the back-end tools and datasets 115. Instead, these back-end retail-specific datasets are advantageously integrated in the user interface 105 by operation of the translator 120. In one embodiment, the pre-configured functions/commands of translator 120 are stored in the workspace schema 303 (as shown and described with respect to FIG. 3).

Example Method

In one embodiment, each step of computer-implemented methods described herein may be performed by a processor (such as processor 1010 as shown and described with reference to FIG. 10) of one or more computing devices (i) accessing memory (such as memory 1015 and/or other computing device components shown and described with reference to FIG. 10) and (ii) configured with logic to cause the system to execute the step of the method (such as Schema-based Back-End Data Analysis Tool Integration Logic 1030 shown and described with reference to FIG. 10). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1015, or storage/disks 1035 of computing device 1005 or remote computers 1065 shown and described with reference to FIG. 10).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 2:
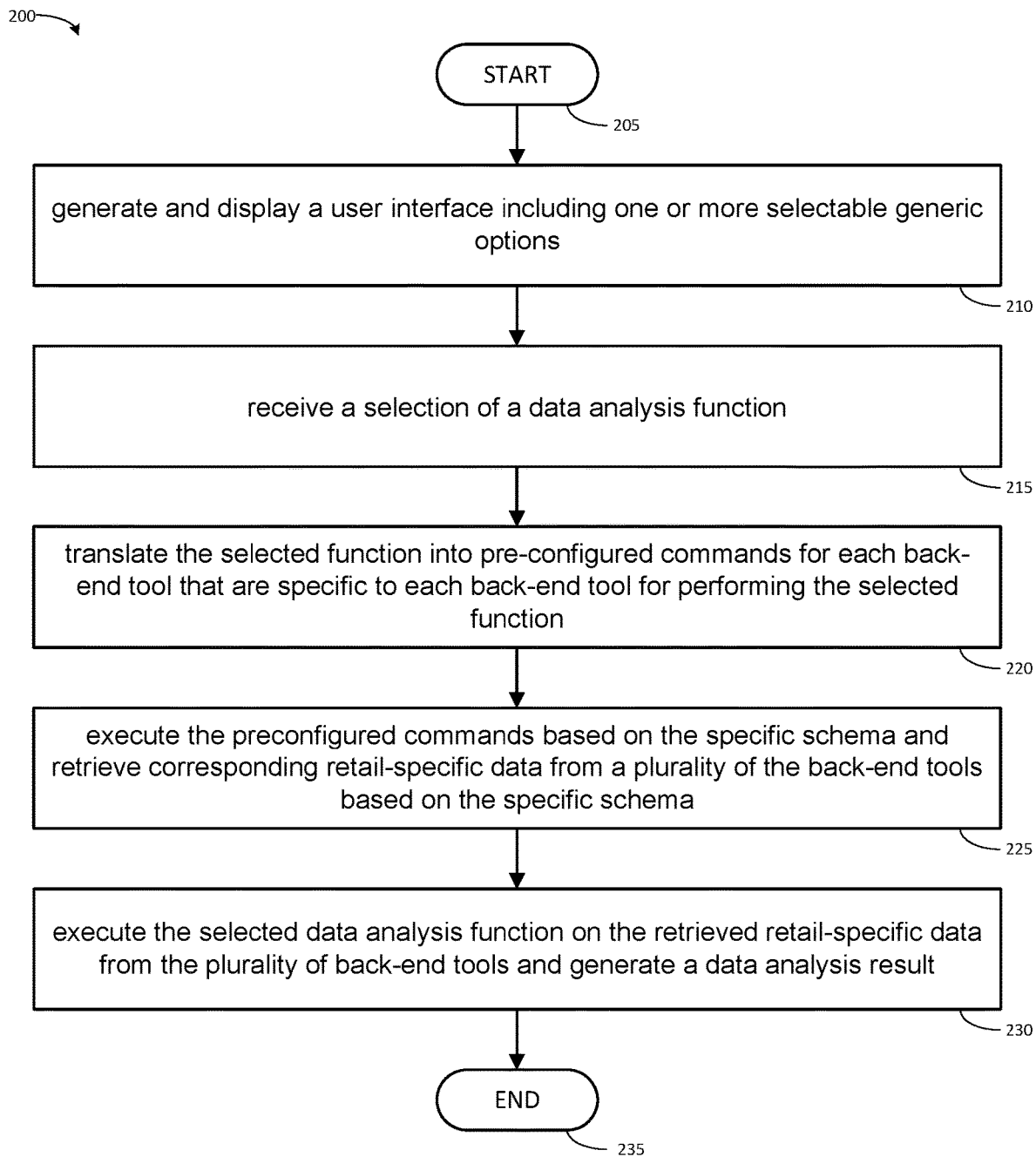
FIG. 2 illustrates one embodiment of a method associated with schema-based integration of back-end data analysis tools.

FIG. 2 illustrates one embodiment of a method 200 associated with schema-based integration of back-end data analysis tools. In one embodiment, the steps of method 200 are performed by integration system 850 (as shown and described with reference to FIG. 8). In one embodiment, integration system 850 is a special purpose computing device (such as computing device 1005) configured with Schema-based Back-End Data Analysis Tool Integration Logic 1030. In one embodiment, integration system 850 is a module of a special purpose computing device configured with logic 1030.

The method 200 may be initiated based on various triggers, such as receiving a signal over a network or parsing stored data indicating that (i) a user (or administrator) of a retailer data system (such as retailer data system 810 as shown and described with reference to FIG. 8 has initiated method 200, (ii) that that method 200 is scheduled to be initiated at defined times or time intervals, or (iii) that a user or administrator of the retailer data system has accessed the user interface 105. The method 200 initiates at START block 205 in response to parsing a signal received or stored data retrieved and determining that the signal or stored data indicates that the method 200 should begin. Processing continues to process block 210.

At process block 210, the processor generates and displays a user interface including one or more selectable generic options.

In one embodiment, the processor executes one or more functions of a web interface server, such as web interface server 840 (as shown and described with reference to FIG. 8) to create a web application graphical user interface (such as user interface 105). In one embodiment, the processor receives a request to display the GUI through a network from one or more remote computers (such as internet 815 and computers 825 and 835 as shown and described with reference to FIG. 8). In response to the request, the processor retrieves from a database and parses code describing the appearance and structure of the GUI for the web application, including the location and content of the one or more selectable generic options. The processor then automatically generates a web page in the form of the GUI in accordance with the parsed description. The processor then transmits the web page through the network to the remote computers to cause the GUI to be displayed by the remote computers, thereby displaying the user interface.

Once the processor has thus completed generating and displaying a user interface including one or more selectable generic options, processing at process block 210 completes, and processing continues to process block 215.

At process block 215, the processor receives a selection of a data analysis function.

In one embodiment, a user of the remote computer enters a mouse click or keystroke that indicates selection of a data analysis function from among the selectable generic options. A web browser detects that the click or keystroke indicated the selection of the data analysis function and transmits a message describing the selection through the network to the web interface server. At the web server, the processor detects the arrival of the message and parses it to determine that the data analysis function is selected. The processor then records the selection, for example in a data structure in memory.

Once the processor has thus completed receiving a selection of a data analysis function, processing at process block 215 completes, and processing continues to process block 220.

At process block 220, the processor translates the selected function into pre-configured commands for each back-end tool that are specific to each back-end tool for performing the selected function. Here, the pre-configured commands identify and access specific schema with a compatible format for reading the specific schema from each back-end tool to expose retail-specific data sets in accordance with the specific schema.

In one embodiment, the steps of process block 220 are performed by translator 120 shown and described with reference to FIG. 1. In one embodiment, the processor parses the stored selection to determine its value, the value indicating which of the generic options, in this case, which particular data analysis function, was selected. The processor compares the value of the stored selection to keys of a mapping between selection values and sets of one or more pre-configured commands until the stored selection value and a key are determined to match. The processor then determines the pre-configured commands associated with the matched key. The processor then retrieves the pre-configured commands from memory. This translation process is executed automatically by the processor in response to the selection of the data analysis function.

Note that there may be a one-to-many relationship between the selected data analysis function and the pre-configured commands—selection of the data analysis function may initiate exposure and retrieval of retail-specific datasets from multiple back-end tools.

Each pre-configured command identifies, among other schemas in a database, a specific schema associated with a back-end tool. The pre-configured command also records the locations of retail-specific information within the specific schema. The pre-configured command is written in a format compatible with executing operations on the specific schema. The pre-configured command, when executed on the back-end tool, is configured to expose and retrieve the retail-specific dataset within the specific schema, and exclude from exposure and retrieval that information that is not retail-specific.

In one embodiment, the retail-specific data includes at least one of cleansed retail data, aggregate retail data, an intermediate result from the execution of a back-end tool, and a final result from the execution of a back-end tool. The determination of what data is retail-specific is made at the time the pre-configured command is initially created. In one example, retail-specific data is that data which is not generic to the operation of the back-end tool—where a tool has uses limited to retail inquiries, for example a customer segmentation tool, a greater portion of the data associated with that tool is likely to be retail-specific, and will be exposed by operation of the pre-configured commands.

Once the processor has thus completed translating the selected function into pre-configured commands for each back-end tool that are specific to each back-end tool for performing the selected function, processing at process block 220 completes, and processing continues to process block 225.

At process block 225, the processor executes the preconfigured commands based on the specific schema and retrieves corresponding retail-specific data from a plurality of the back-end tools based on the specific schema.

In one embodiment, the processor creates a schema associated with the user interface 105 (occasionally referred to herein as a workspace schema). For each back-end tool, the processor updates the schema associated with the user interface 105 to include synonyms for the data fields of the retail-specific dataset of the schema associated with the backend tool. Inclusion of the synonyms in the workspace schema exposes the retail specific datasets for further use.

Figure 3:
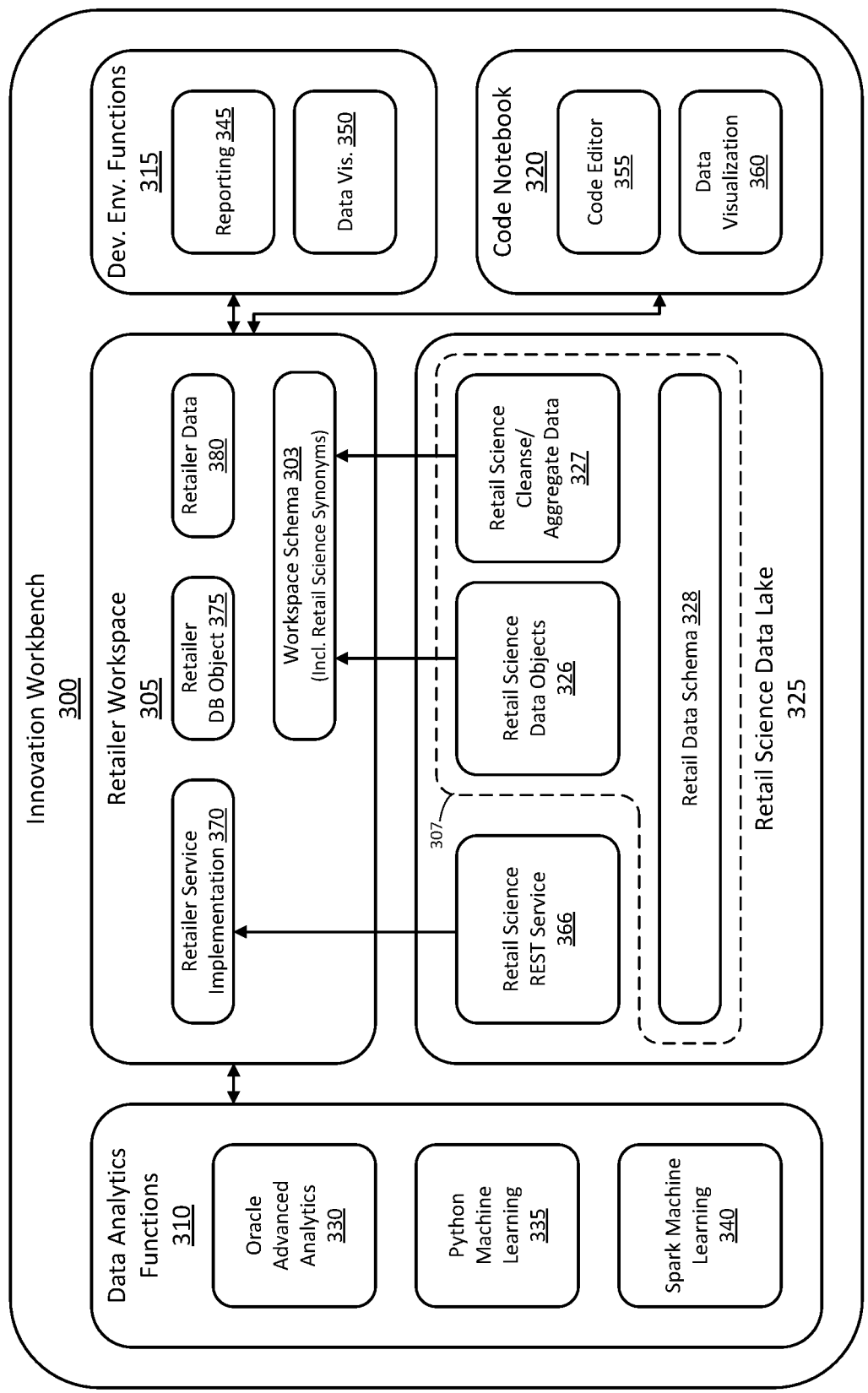
FIG. 3 illustrates one embodiment of a system associated with schema-based integration of back-end data analysis tools.

In one embodiment, as part of integrating the data from back-end tools and datasets (for example, from Oracle Retail Advanced Science Engine) in a user-accessible front end, the processor (i) creates a retailer workspace schema (such as retailer workspace schema 303 as shown and described with respect to FIG. 3), and (ii) makes a retail science data model available by defining synonyms. In one embodiment, the processor retrieves data belonging to the retail specific data sets by accessing them through their synonyms.

Once the processor has thus completed executing the preconfigured commands based on the specific schema and retrieving corresponding retail-specific data from a plurality of the back-end tools based on the specific schema, processing at process block 225 completes, and processing continues to process block 230.

At process block 230, the processor executes the selected data analysis function on the retrieved retail-specific data from the plurality of back-end tools and generates a data analysis result In one embodiment, the processor selects fields among the retail-specific data, for example by selecting their synonyms in the workspace schema, that the processor will assign as inputs to the selected data analysis function. In one embodiment, the assignment of inputs is performed automatically in response to the initial selection of the data analysis function. In one embodiment, processor solicits additional selections of the inputs through the GUI. The processor then executes the data analysis function on the selected inputs to generate a data analysis result. The processor then stores the data analysis result in a data structure in memory or in the workspace schema.

Once the processor has thus completed executing the selected data analysis function on the retrieved retail-specific data from the plurality of back-end tools and generate a data analysis result, processing at process block 230 completes, and processing continues to END block 235, where process 200 ends.

In one embodiment, method 200 may further include the processor receiving a command declaratively creating a restful service definition for a result of the executing data analysis function. In one embodiment, the processor receives code defining the restful service. In one example, the code is received as shown and described with reference to FIG. 500 herein. The code may be written using SQL query language and/or PL/SQL procedural language, or other query or procedural languages. In one embodiment, the declarative creation of the restful service is performed by selecting a "share" option associated with a result, and the restful service is automatically created using a standard REST API. In one embodiment, the method 200 may further include the processor may further include transmitting and controlling the transmission (for example by REST API) of a result of the executing data analysis function to enable other processes to act on the basis of that result.

Example System

In one embodiment, selected retail datasets/libraries are exposed from applications and tools by means of a generated retail data schema, and integrated with the platform, as shown in FIG. 3. FIG. 3 illustrates one embodiment of a "innovation workbench" system 300 associated with schema-based integration of back-end data analysis tools. In one embodiment, system 300 has three broad categories of components: a retail science data model; data mining tools (for example, both Oracle and open source tools); and artificial intelligence and modeling libraries and components.

In one embodiment, system 300 includes a retailer workspace 305 that may be accessed by one or more users of the system 300 that are associated with the retailer. System 300 also includes a set of data analytics functions 310, a set of software development environment functions 315, a code notebook 320, and a repository of retail science-related data stored in its natural format, also referred to as a retail science data lake 325.

In one embodiment, when system 300 is initiated, a workspace schema 303 is created to support the operations of retailer workspace 305. In one embodiment, the workspace schema exposes back-end data processing tools and their hidden intermediate values by including synonyms for their locations in back-end schema. In one example, the processor creates the synonyms at least in part by executing the following SQL command:

CREATE OR REPLACE SYNONYM rse_prod_hier FOR
retail_science_user.rse_prod_hier;

and the processor grants privileges at least in part by executing the following SQL command:

GRANT select ON rse_prod_hier TO
retailer_science_workspace;

In one embodiment, this serves to create the retail workspace schema 303 and make a retail science data model 307 available within retailer workspace 305.

In one embodiment, the retail science data model 307 is a combination of retail science data objects 326 and retail science utilities represented as objects (such as retail science cleanse/aggregate data module 327) drawn from retail science data lake 325. The retail science data model 307 contains database objects that are pre-made to explore cleansed, sampled and aggregated data, and to mine data. In one embodiment, these database objects are implemented as part of the Oracle Retail Advanced Science Engine (ORASE). In one embodiment, a retail data schema 328 included in data lake 325 is included in the retail science data model 307. In one embodiment the retail science data model 307 is made available for use in the workspace 305 through the database synonyms and privileges in workspace schema 303, as described above. Note that in one embodiment, workspace schema 303 includes both data describing the workspace 305 and the configurations of applications assembled in the workspace 305, as well as the synonyms for certain back-end objects and data (for example, ORASE synonyms).

The exposure of the data components of the retail science data model 307 through workspace schema 303 enables a user to perform varied data analysis functions across multiple dimension like Customer, Product, Locations and Calendar. Additionally exposed through the workspace schema 303 are intermediate and final results of back-end data science tools like space optimization, assortment optimization, and offer optimization tools.

Data, such as data managed in retail data schema 328 or maintained elsewhere in data lake 325, can be put into different categories. For example, the categories may include: sales data (such as customer-linked transaction data, point of sales data, and market basket data); inventory data; returns data; hierarchies (such as product, location, and calendar hierarchies); "Big Data" (such as weather data and clickstream data); and retail science solution (one type of back-end tool) results including consumer decision trees, decision trees, store clustering, customer segmentation, offer optimization solutions, assortment optimization solutions, price optimization solutions, markdown optimization solutions, space optimization solutions, and return logistics. Each of these categories can be considered examples of retail-specific data—data that can be informative in making decisions related to retail business operations and planning. In one embodiment, the various retail science solutions (one type of back-end tool) are exposed as objects with specific synonyms in workspace schema 303.

Data in all of the above categories may be pre-packaged in multiple states. For example, the data may be provided as core, cleansed, aggregated, sampled, intermediate results, and final results. These summarizations may be divided along different dimensions like Customer, Product, Location, and Calendar dimensions. This pre-packaging or collection of data on a common basis enables users to use the data without requiring initial data preparation. These pre-packaged data groups are exposed as objects with specific synonyms in workspace schema 303. In one embodiment, the exposed pre-packaged objects include around 1800 tables with various slices of data that provides retailer an extensible and customizable environment for exploring data, training and testing machine learning models.

In one embodiment, other generic database utilities (another form of back-end tool) are made available in the workspace 305. These utilities are well tested functions for data mining. The user is not required to develop these utilities themselves. Instead, where they are part of the retail science data model 307 or data lake 325, they may be exposed as objects with specific synonyms in workspace schema 303. Or, in one embodiment, these database utilities may be available from the data analytics functions 310, the development environment functions 315, the code notebook 320.

In one embodiment, the system 300 bundles libraries for different languages. For example, the following libraries may be used across different phases of data mining:
1. Ensemble Machine Learning Algorithms with scikit-learn for modeling;
2. Deep Learning Library using TensorFlow, Keras for self-learning;
3. Data exploration & analysis using Pandas; NumPy; SciPy for exploring and analyzing samples, data, and attributes needed for modeling;
4. Data visualization using Matplotlib; Seaborn for viewing results, outliers, or exceptions after modeling;
5. Data Storage using cx_Oracle for reading and writing data to retailer workspace schema
6. Graphs algorithm using Networkx; and
7. Optimization Solver using Gurobi for linear optimization problem.

In one embodiment these libraries are scanned for vulnerabilities and dependencies and installed along with retail science applications. These libraries are across different languages like Python and R libraries. Further, the platform also customizes and extends these libraries to provide access to underlying data, libraries, and functionalities, as shown and described with reference FIG. 1 and to process blocks 220 and 225 of FIG. 2, above.

In one embodiment, the platform may also bundle a "Get Started" workspace including examples for the libraries exposed and instructional sample code. For example, the starter kit may demonstrate retail business cases so that data scientists and software engineers can refer to them to rapidly prototype application functionality. With the variety of tools included in the platform for integration, users can use tools of their own choice like Python, R or ODM, import existing code, or upload pre-built models, to further built upon existing implementations.

Further, the platform bundles packages using
    pip install $package
where "package" is matplotlib, Networkx and so on. Once libraries are bundled with the platform, installer creates the workspace 305 for the retailer (for example when using Oracle APEX) and associates it with the workspace schema 303 defined at initiation of system 300.

In one embodiment, a workspace is a virtual private database allowing multiple users to work within the same database-driven software development environment (such as Oracle APEX) installation while keeping their objects, data and applications private. This workspace 305 is a shared work area within the retailer data system that allows multiple users to work using retail science data objects, data, and applications available. In one embodiment, the workspace 305 has access to the data analytics functions 310, the development environment functions 315, the code notebook 320, and the data lake 325.

In one embodiment, the graphical user interface 105 provides a visual representation of workspace 305, and includes selectable options and accepts commands for creating, configuring, or manipulating data and applications in the workspace 305. In one embodiment, the graphical user interface 105 displays results of one or more applications configured in accordance with commands and options entered into the workspace through the graphical user interface 105.

In one embodiment, data analytics functions 310 includes data analytics libraries from multiple vendors, for example Oracle Advanced Analytics 330 (including Oracle Data Mining and Oracle R functions), Python Machine Learning 335, and Spark Machine Learning 340 libraries. The libraries include one or more implementations of one or more of the following machine learning algorithms: classification algorithms such as decision tree, logistic regression, naive Bayes, support vector machine, and random forest algorithms; regression algorithms such as linear model, generalized linear model, multi-layer neural networks, stepwise linear regression, and support vector machine algorithms; clustering algorithms such as hierarchical k-means and orthogonal partitioning clustering; attribute importance algorithms such as minimum description length; anomaly detection algorithms such as a 1 class support vector machine; market basket analysis algorithms such as a priori—association rules; feature extraction algorithms such as non-negative matrix factorization, principle component analysis, and singular value decomposition; and time series algorithms such as single exponential smoothing and double exponential smoothing. Each library may have its own implementation of the algorithm. In one embodiment, the data analytics functions In one embodiment, the development environment 315 includes reporting functions 345 and data visualization functions 350. These functions 345, 350 are accessible to the retailer workspace 305. These functions 345, 350 may be combined with other data processing functions by commands entered through the user interface 105 to present data from the combined functions for user review. The user may make selections or enter commands through the user interface 105 to select the particular data that will be presented by a reporting function 345 or data visualization function 350. Executing reporting function 345 will generate a report, for example an interactive grid report, an interactive report, or a simple table report (such as those available in Oracle APEX) including the data selected. Executing the data visualization function 350 will generates instructions to display a visualization, such as a graph or chart (such as those available in Oracle APEX) to display the data selected.

In one embodiment, the code notebook 320 allows data scientist to create and edit a collection of documentation, snippets of code, and visualizations. The code notebook 320 may include or be bundled with modules (such as Python modules) for machine learning, data mining, natural language processing, network analysis, and optimization solvers. In one embodiment, the code notebook 320 includes a code editor 355 and further data visualization functions 360 (and or report functions). In one embodiment, the further data visualization functions 360 or reporting functions are similar to those described above with reference to the development environment functions 315, but may be displayed adjacent to code within the code notebook 320.

In one embodiment, code editor 355 enables the user to enter computer code text and save it for interpretation and execution through the graphical user interface 105. In one embodiment, the code includes code written in the Python language. The code may be written in discrete cells that may be made enabled or disabled for execution by selection of an option. Thus, when a user wishes to use a code cell, the user may select the option to enable it, and then select an option that causes the code to be interpreted and executed. Individual code cells or groups of code cells may be accessed for execution from the workspace, and may be combined with other functions and data, as shown and described with reference to FIG. 5.

In one embodiment, one or more of the bundled libraries are Python libraries and may be accessed and put into service using the code notebook 320. In one embodiment, these libraries are modules executing as software-as-a-service. In one embodiment these libraries may be accessed from the retailer workspace 305 and combined with other functions, or operate on data exposed, for example, as synonyms through workspace schema 303.

In one embodiment, the retail data lake 325 includes pre-packaged cleansed data, aggregates, and intermediate results along with collection of diverse data science tools. This can enable a user to more rapidly construct custom functions and extensions. In one embodiment, the data lake 325 includes retail data schema 328, retail science REST service 366, retail science data objects 326, and retail science cleanse and aggregate data module 327. In one embodiment, the data lake 325 is managed with the Hadoop Distributed File System (HDFS) and MapReduce engine, and may include other software utilities for processing large (or very large, Big Data) amounts of unstructured data. Advantageously, a data scientist can use the system to ingest unstructured data quickly into the data lake 325, and prepare it later, on the fly, as data is put to use in the workspace 305.

For example, the cleanse and aggregate data module 327 pre-packages cleansed and or aggregated data compiled from underlying data created or ingested. The cleanse and aggregate data module 327 cleanses raw data. For example, cleanse and aggregate data module 327 may remove or filter customer purchasing information associated with a generic "store" customer loyalty accounts (or other fake account) before providing access to that data. A "store" account are a default or general account used by a retail store to grant a customer loyalty discount during purchase when a customer does not have a loyalty card with them, and accordingly provides little benefit to a data scientist attempting to differentiate customer activities. Other data cleanse operations may be performed by the cleanse and aggregate data module 327.

The cleanse and aggregate data module 327 also aggregates raw data. For example, retail data may be aggregated into packages based on sales location, week, month, or other timeframe, customer, or other attributes. The aggregate packages are presented as objects. Some selected example pre-packaged aggregate objects include:

aggregate sales data for the dimensions of a location and a week;
aggregate sales data for the dimensions of a products, location, customer segment, and week; and
aggregate sales data for the dimensions of a product and a week.

This is not an exhaustive list of pre-packaged aggregate objects. Other aggregations convenient or useful to a data scientist may be similarly pre-packaged as an object by the cleanse and aggregate data module 327, as will be understood by the skilled artisan.

In one embodiment, data lake 325 includes Retail Science REST service 366. REST service 366 ingests $3^{rd}$ party and public data into the data lake 325. For example, public data available through REST service 366 may include, for example, weather data or market data. Third party data may come from data services offered by third party vendors such as AC Nielsen or Prism. In one embodiment, the third party data may be a retailer-commissioned analysis of the retailer's stores. The third party data thus enriches the data available from the data lake for use in applications constructed using the platform. The third party data is provided by rest requests to the REST service 366. The third party data is exposed to the workspace 305 by retailer service implementation 370. In one embodiment, service implementation 370 retrieves and/or updates the third party data ingested by REST service 366 for use within workspace 305.

In one embodiment, retailer workspace 305 includes one or more retailer database objects 375 and retailer data 380. Retailer database object 375 may be an object from an additional database including data from sources other than data lake 325 to be incorporated in an application assembled or configured in the workspace 305. Similarly, retailer data 380 may be data from an additional database to provide data from a source other than data lake 325. Retailer database objects 375 and retailer data 380 may be uploaded to workspace 305. Retailer database objects 375 may be created in workspace 305. Retailer data 380 may be generated by the operation of applications operating in workspace 305. Retailer database objects 375 and retailer data 380 may be exported or defined as REST data sources for access by other systems.

Note that in one embodiment, user interface 105 can be used to select and manipulate all data and objects included in or accessible to the workspace 305.

Advantageously, the configuration shown and described with respect to FIG. 3 enables users to eliminate the most time consuming steps of data mining: loading and cleansing data, and loading and configuring models and insight applications, and instead reuse already bundled data, models, and objects to model, gain new insights, and collaborate. This significantly reduces total cost of ownership because need no third-party vendors or consultants to perform preliminary data load and data preparation tasks, or to load models. The user can instead focus on core data mining functionalities. The user not only has access to custom models they built, but they can also access results from the pre-built, back-end models shared or exposed through workspace schema 303.

In one embodiment, an example system is initiated by creating a schema (including synonyms and privileges to expose back-end components), scanning libraries of pre-configured data processing tools for vulnerabilities, customizing the libraries, and bundling the libraries, creating a workspace that links the schema and libraries, presenting "get started" or "how to" information when the workspace is initially accessed, and accepting user commands and selections to create applications to analyze, visualize, and report.

Example Method for Integration of Multiple Tools

In one embodiment, the platform offers access to multiple back-end retail analysis (data science) tools, and it allows users to experiment with combining multiple data science techniques to achieve a compound result and/or comparing alternative data science techniques to compare built-in and custom results. In one embodiment, the integration and compound results are an extension to an application building tool or rapid application development platform, for example a low-code development platform such as Oracle APEX. For example, the building tool can be used to visualize data using charts, and review reports and integrate one data science application with other data science applications. Further, RESTful web services can be used to declaratively create and edit RESTful Service definitions using SQL Query/PLSQL language in order to provide results to other systems. The combined applications can integrate analytics, machine learning, and deep learning output from the discovery service. This enables users of the system to experiment and user alternative data science techniques to compare and combine features and results from both pre-built and custom results. The user can view results from pre-configured tools, find outliers and apply different machine learning techniques to handle data exceptions, or use include their independently-developed, in-house "secret sauce" tools in the combined application. These combined or ensemble results can lead to improved results and better insights. Once the combined application is completed to the user's satisfaction, it can be immediately be made available as a software-as-a-service application to other systems, for example by a REST service.

Figure 4:
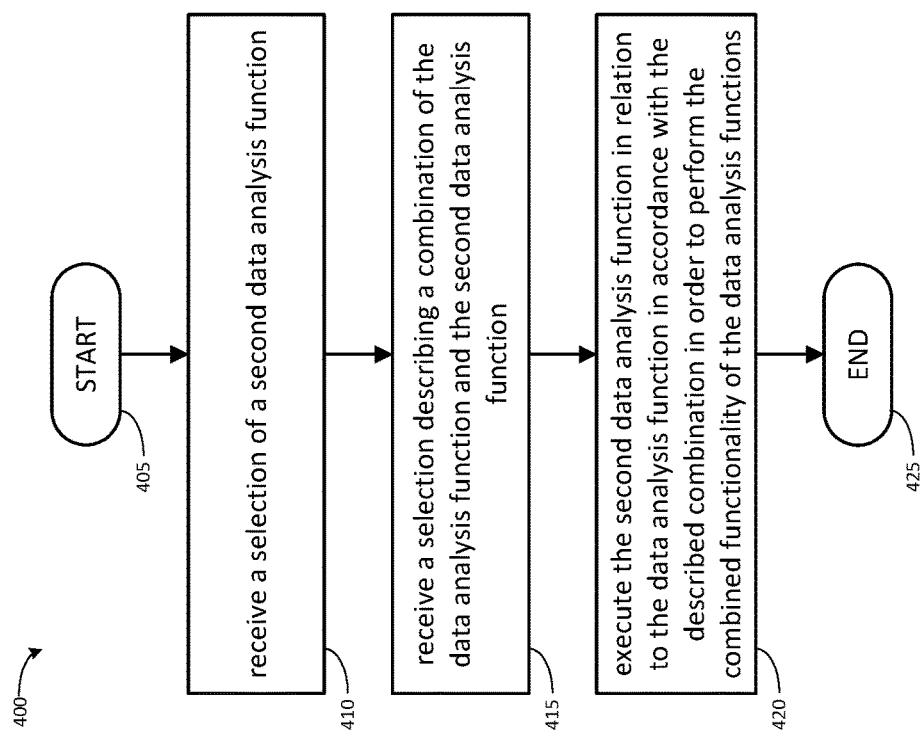
FIG. 4 illustrates one embodiment of a method associated with schema-based integration of multiple back-end retail analysis tools.

FIG. 4 illustrates one embodiment of a method 400 associated with schema-based integration of multiple back-end retail analysis tools. In one embodiment, the steps of method 400 performed by integration system 850 (as shown and described with reference to FIG. 8).

The method 400 may be initiated based on various triggers, such as receiving a signal over a network or parsing stored data indicating that (i) a user (or administrator) of the retailer data system 810 has initiated method 400, or (ii) a user (or administrator) of the retailer data system 810 has entered a user input intended to select a second data analysis function. The method 400 initiates at START block 405 in response to parsing a signal received or stored data retrieved and determining that the signal or stored data indicates that the method 400 should begin. Processing continues to process block 410.

At process block 410, the processor receives a selection of a second data analysis function. In one embodiment, a user of the remote computer enters a mouse click or keystroke that indicates selection of a second data analysis function from among the selectable generic options. A web browser detects that the click or keystroke indicated the selection of the second data analysis function and transmits a message describing the selection through the network to the web interface server. At the web server, the processor detects the arrival of the message and parses it to determine that the second data analysis function is selected. The processor then records the selection, for example in a data structure in memory. Once the processor has thus completed receiving a selection of a second data analysis function, processing at process block 410 completes, and processing continues to process block 415.

In one embodiment, in response to the selection of the second data analysis function, the processor translates the second data analysis function into pre-configured commands to each back end tool for performing the second function and executes those preconfigured commands and exposes or retrieves retail-specific data from the back end tools for performing the second function in a similar fashion to that shown and described above with reference to method 200 of FIG. 2.

At process block 415, the processor receives a selection describing a combination of the data analysis function and the second data analysis function. In one embodiment, the user of the remote computer enters a mouse click or keystroke that indicates selection of an arrangement of the second data analysis function with respect to the first data analysis function. For example, the arrangement may direct an output of the first data analysis function to be an input to the second data analysis function, or an output of the second data analysis function to be an input to the first data analysis function. Or, for example, the arrangement may direct the first and second data analysis functions to be executed in parallel, for example in relationship to a third function. The processor then records the selection, for example in a data structure in memory. In one embodiment, the selection is saved as a mapping of the inputs and/or outputs of the second function in the workspace schema 303 or other storage location. Note that the inputs and outputs of the first data analysis function may also be mapped in the workspace schema 303 or other storage location. Note that the inputs and outputs of the data analysis function may also be mapped in the workspace schema 303 or other storage location. Inputs can be mapped from function outputs, data storage (such as workspace schema 303 data lake 325, or retailer data 380), or other locations connected to the platform. Outputs can be mapped to function inputs, data storage, or other locations connected to the platform, and further may be shared to other systems using REST services. Once the processor has thus completed receiving a selection describing a combination of the data analysis function and the second data analysis function, processing at process block 415 completes, and processing continues to process block 420.

At process block 420, the processor executes the second data analysis function in relation to the data analysis function in accordance with the described combination in order to perform the combined functionality of the data analysis functions. In one embodiment, the processor parses the mapping of the inputs and/or outputs of the second data processing function, and mapping of the inputs and/or outputs of the first data processing function. The processor then executes the first and second data analysis functions, and provides the outputs of the functions to the destinations described by the parsed mappings. Once the processor has thus completed executing the second data analysis function in relation to the data analysis function in accordance with the described combination in order to perform the combined functionality of the data analysis functions, processing at process block 420 completes, and processing continues to END block 425, where process 400 ends.

Example Method for Integration with
User-Generated Code

In one embodiment, the platform also enables a user to incorporate their own directly coded functions. For example, data scientists can use tools of their own choice like Python, R or ODM, import existing code, or upload pre-built models, to further built upon existing implementations. Further, a "starter kit" that demonstrates code applied to a retail business case may be provided to assist data scientists and software engineers to rapidly prototype application functionality.

Figure 5:
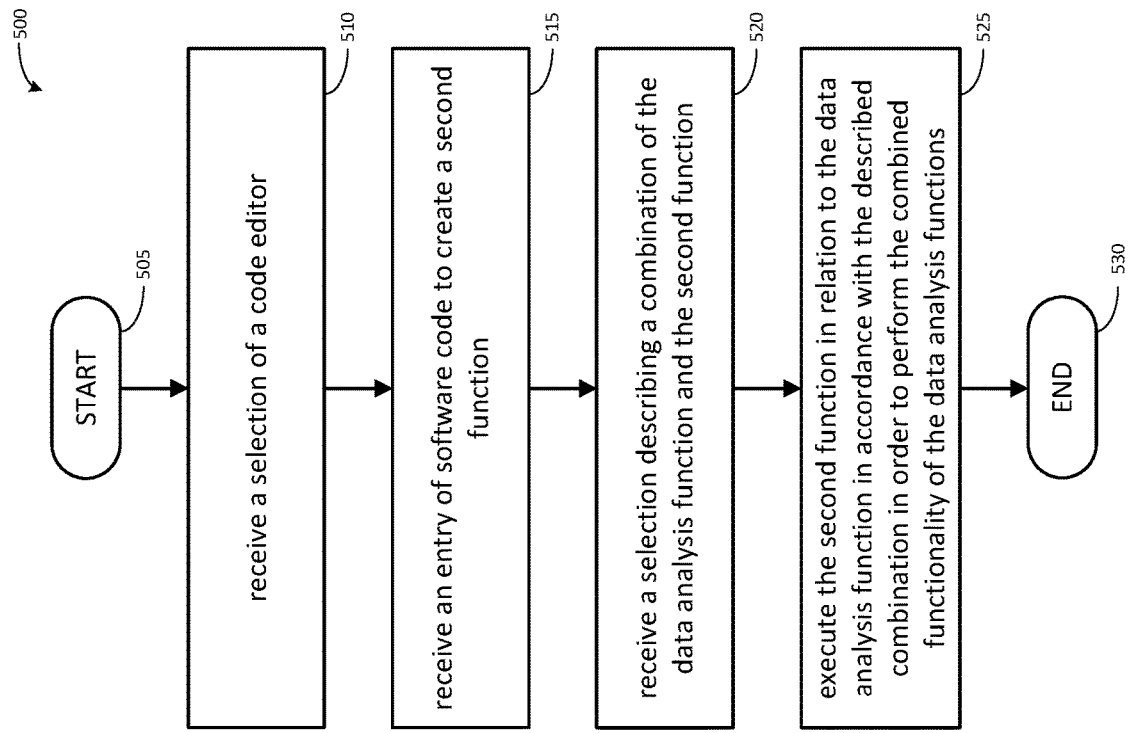
FIG. 5 illustrates one embodiment of a method associated with schema-based integration of back-end data analysis tools and user-created code.

FIG. 5 illustrates one embodiment of a method 500 associated with schema-based integration of back-end data analysis tools with user-created code. In one embodiment, the steps of method 500 performed by integration system 850 (as shown and described with reference to FIG. 8).

The method 500 may be initiated based on various triggers, such as receiving a signal over a network or parsing stored data indicating that (i) a user (or administrator) of the retailer data system 810 has initiated method 500, or (ii) a user (or administrator) of the retailer data system 810 has entered a user input intended to select a code editor. The method 500 initiates at START block 505 in response to parsing a signal received or stored data retrieved and determining that the signal or stored data indicates that the method 500 should begin. Processing continues to process block 510.

At process block 510, the processor receives a selection of a code editor. In one embodiment, a user of the remote computer enters a mouse click or keystroke that indicates selection of a code editor from among the selectable generic options. A web browser detects that the click or keystroke indicated the selection of the code editor and transmits a message describing the selection through the network to the web interface server. At the web server, the processor detects the arrival of the message and parses it to determine that the code editor is selected. The processor then records the selection, for example in a data structure in memory. Once the processor has thus completed receiving a selection of a code editor, processing at process block 510 completes, and processing continues to process block 515.

At process block 515, the processor receives an entry of software code to create a second function. In one embodiment, the processor displays a text entry field for accepting software code. A user of the remote computer enters a sequence of keystrokes that make up software code for a second function. The processor stores the software code for the second function in the workspace schema. In one embodiment, the code is an interpreted language (such as Python) or scripting language (such as JavaScript) that need not be compiled before execution. In one embodiment, the code is in a data query language (such as SQL), and in one example including procedural extensions (such as in PL/SQL). Once the processor has thus completed receiving an entry of software code to create a second function, processing at process block 515 completes, and processing continues to process block 520.

At process block 520, the processor receives a selection describing a combination of the data analysis function and the second function. In one embodiment, the user of the remote computer enters a mouse click or keystroke that indicates selection of an arrangement of the second function with respect to the data analysis function. For example, the arrangement may direct an output of the data analysis function to be an input to the second function, or an output of the second function to be an input to the data analysis function. Or, for example, the arrangement may direct the data analysis function and second data analysis functions to be executed in parallel, for example in relationship to a third function. The processor then records the selection, for example in a data structure in memory. In one embodiment, the selection is saved as a mapping of the inputs and/or outputs of the second function in the workspace schema 303 or other storage location. The mappings may indicate variables or lines of code in the second function. Note that the inputs and outputs of the data analysis function may also be mapped in the workspace schema 303 or other storage location. Inputs can be mapped from function outputs, data storage, or other platform locations, and outputs can be mapped to function inputs, data storage, or other platform locations or shared through REST services, as discussed with further detail with respect to process block 415 above. Once the processor has thus completed receiving a selection describing a combination of the data analysis function and the second function, processing at process block 520 completes, and processing continues to process block 525.

At process block 525, the processor executes the second function in relation to the data analysis function in accordance with the described combination in order to perform the combined functionality of the data analysis functions. In one embodiment, the processor parses the mapping of the inputs and/or outputs of the second function, and the mapping of the inputs and/or outputs of the first data processing function. The processor executes the first data analysis function, and provides the outputs of the function to the destinations described by the parsed mappings. In one embodiment, the processor detects the language of the software code that makes up the second function. The processor initiates an interpreter for the detected language to directly execute the software code of the second function. The processor executes the interpreter on the software code to execute the second function. The processor provides the outputs of the function to the destinations described by the parsed mappings. Once the processor has thus completed executing the second function in relation to the data analysis function in accordance with the described combination in order to perform the combined functionality of the data analysis functions, processing at process block 525 completes, and processing continues to END block 530, where process 500 ends.

Example Method for Integration with Visualization
Tools

In one embodiment, the platform includes interactive graph visualization tools for visual graph creation. Interactive graph visualization supports highlighting, expansion and applying filters. Using these tools, users can create data graphs that present data in forms that are easier to understand, highlight trends and outliers and share report with business.

Figure 6:
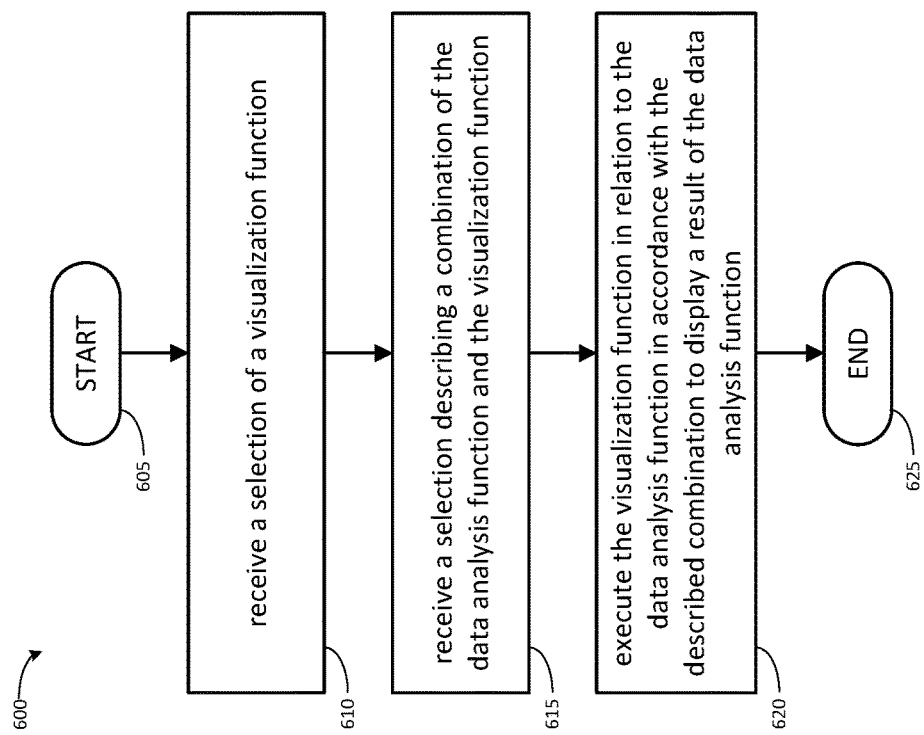
FIG. 6 illustrates one embodiment of a method associated with schema-based integration of back-end data analysis tools and visualization functions.

FIG. 6 illustrates one embodiment of a method 600 associated with schema-based integration of back-end data analysis tools with visualization functions. In one embodiment, the steps of method 600 performed by integration system 850 (as shown and described with reference to FIG. 8).

The method 600 may be initiated based on various triggers, such as receiving a signal over a network or parsing stored data indicating that (i) a user (or administrator) of the retailer data system 810 has initiated method 600, or (ii) a user (or administrator) of the retailer data system 810 has entered a user input intended to select a visualization function. The method 600 initiates at START block 605 in response to parsing a signal received or stored data retrieved and determining that the signal or stored data indicates that the method 600 should begin. Processing continues to process block 610.

At process block 610, the processor receives a selection of a visualization function. In one embodiment, a user of the remote computer enters a mouse click or keystroke that indicates selection of a visualization function from among the selectable generic options. A web browser detects that the click or keystroke indicated the selection of the visualization function and transmits a message describing the selection through the network to the web interface server. At the web server, the processor detects the arrival of the message and parses it to determine that the visualization function is selected. The processor then records the selection, for example in a data structure in memory. Once the processor has thus completed receiving a selection of a visualization function, processing at process block 610 completes, and processing continues to process block 615.

At process block 615, the processor receives a selection describing a combination of the data analysis function and the visualization function. In one embodiment, the user of the remote computer enters a mouse click or keystroke that indicates selection of an arrangement of the visualization function with respect to the data analysis function. For example, the arrangement may direct an output of the first data analysis function to be an input to the visualization function. Further, for example, other data or other function outputs may be directed as additional inputs to the visualization function. The processor then records the selection, for example in a data structure in memory. In one embodiment, the selection is saved as a mapping of the inputs of the visualization function in the workspace schema 303 or other storage location. Note that the inputs and outputs of the data analysis function may also be mapped, for example as inputs to the visualization function, in the workspace schema 303 or other storage location. Inputs can be mapped from function outputs, data storage, or other platform locations, and outputs can be mapped to function inputs, data storage, or other platform locations or shared through REST services, as discussed with further detail with respect to process block 415 above. Once the processor has thus completed receiving a selection describing a combination of the data analysis function and the visualization function, processing at process block 615 completes, and processing continues to process block 620.

At process block 620, the processor executes the visualization function in relation to the data analysis function in accordance with the described combination to display a result of the data analysis function. In one embodiment, the processor parses the stored input information to determine the inputs of the visualization function, including those from the data analysis function. The processor then executes the visualization function based on the inputs. By executing the visualization function, the processor generates instructions to display a visualization, such as a graph or chart of some or all of the input data. In one embodiment, the visualization function continues execution as input data changes, and updates the visualization, for example updating the visualization substantially in real time in response to live data updates. In one embodiment, the processor also generates instructions to control a display (for example on a remote computer) to display the visualization, and transmits those instructions to the remote computer to cause the visualization to be displayed. The display control instructions may be repeated as the visualization updates, to cause the display to be updated substantially in real time. In one embodiment, the visualizations are static, and not updated. In one embodiment, the visualizations, such as the static visualizations, may be exported for storage and later retrieval.

In one embodiment, the visualization functions are widgets—in this case interface components for creating a particular type of visualization. In one embodiment, the visualization functions are part of a library of visualization functions. In one embodiment, the library of visualization functions is the data visualization functions 350 included as part of the development environment functions 315, such as Oracle APEX Jet Chart. In one embodiment, the library of visualization functions is the data visualization functions 360 included as part of code notebook 320, for example Matplotlib, Seaborn data visualization library.

Once the processor has thus completed executing the visualization function in relation to the data analysis function in accordance with the described combination to display a result of the data analysis function, processing at process block 620 completes, and processing continues to END block 625, where process 600 ends.

In one embodiment, visualizations can reviewed in the development environment (such as Oracle APEX) or integrated into other applications.

In one embodiment, the static visualizations can be exported.

Example Method for Integration with Report Tools

Figure 7:
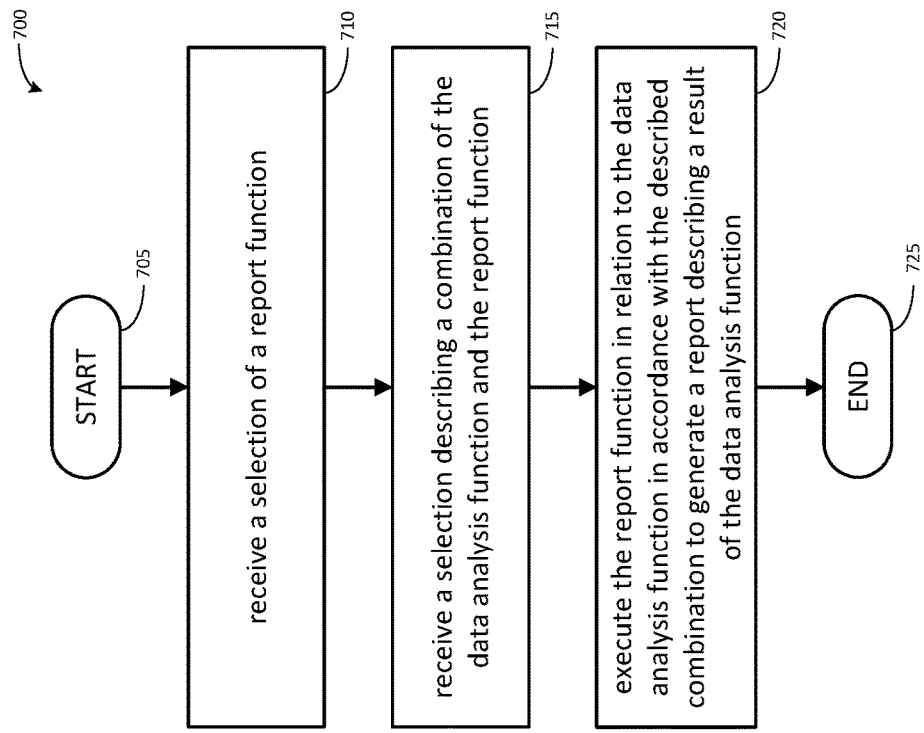
FIG. 7 illustrates one embodiment of a method associated with schema-based integration of back-end data analysis tools and report functions.

FIG. 7 illustrates one embodiment of a method 700 associated with schema-based integration of back-end data analysis tools with report functions. In one embodiment, the steps of method 700 performed by integration system 850 (as shown and described with reference to FIG. 8).

The method 700 may be initiated based on various triggers, such as receiving a signal over a network or parsing stored data indicating that (i) a user (or administrator) of the retailer data system 810 has initiated method 700, or (ii) a user (or administrator) of the retailer data system 810 has entered a user input intended to select a report function. The method 700 initiates at START block 705 in response to parsing a signal received or stored data retrieved and determining that the signal or stored data indicates that the method 700 should begin. Processing continues to process block 710.

At process block 710, the processor receives a selection of a report function. In one embodiment, a user of the remote computer enters a mouse click or keystroke that indicates selection of a report function from among the selectable generic options. A web browser detects that the click or keystroke indicated the selection of the report function and transmits a message describing the selection through the network to the web interface server. At the web server, the processor detects the arrival of the message and parses it to determine that the report function is selected. The processor then records the selection, for example in a data structure in memory. Once the processor has thus completed receiving a selection of a report function, processing at process block 710 completes, and processing continues to process block 715.

At process block 715, the processor receives a selection describing a combination of the data analysis function and the report function. In one embodiment, the user of the remote computer enters a mouse click or keystroke that indicates selection of an arrangement of the report function with respect to the data analysis function. For example, the arrangement may direct an output of the first data analysis function to be an input to the report function. Further, for example, other data or other function outputs may be directed as additional inputs to the report function. The processor then records the selection, for example in a data structure in memory. In one embodiment, the selection is saved as a mapping of the inputs of the report function in the workspace schema 303 or other storage location. Note that the inputs and outputs of the data analysis function may also be mapped, for example as inputs to the report function, in the workspace schema 303 or other storage location. Inputs can be mapped from function outputs, data storage, or other platform locations, and outputs can be mapped to function inputs, data storage, or other platform locations or shared through REST services, as discussed with further detail with respect to process block 415 above. Once the processor has thus completed receiving a selection describing a combination of the data analysis function and the report function, processing at process block 715 completes, and processing continues to process block 720.

At process block 720, the processor executes the report function in relation to the data analysis function in accordance with the described combination to generate a report describing a result of the data analysis function.

In one embodiment, the processor parses the stored input information to determine the inputs of the report function, including those from the data analysis function. The processor the n executes the report function based on the inputs. By executing the report function, the processor generates a report, for example an interactive grid report, an interactive report, or a simple table report. The processor stores the report in the workspace schema 303 or other storage location. In one embodiment, the processor also generates instructions to control a display (for example on a remote computer) to display the report, and transmits those instructions to the remote computer to cause the report to be displayed. In one embodiment, the report function continues execution as input data changes, and updates the report, for example updating the report or producing new reports substantially in real time in response to live data updates. The display control instructions may be repeated as the report updates, to cause the display to be updated substantially in real time. In one embodiment, the report are static, and not updated. In one embodiment, the report, such as the static report, may be exported for storage and later retrieval.

Once the processor has thus completed executing the report function in relation to the data analysis function in accordance with the described combination to generate a report describing a result of the data analysis function, processing at process block 720 completes, and processing continues to END block 725, where process 700 ends.

In one embodiment, reports can reviewed in the development environment (such as Oracle APEX) or integrated into other applications.

Example Computing Environment

FIG. 8 illustrates one embodiment of a computing environment 800 associated with schema-based integration of back-end data analysis tools. Computing environment 800 includes a retailer network 805 and a retailer data system 810 connected through the Internet or other suitable communications network or combination of networks 815.

Retailer network 805 may be associated with a retail business, such as a fashion (clothing, footwear, accessories, etc.) retailer or a grocer, or other type of business. For simplicity and clarity of explanation, the retailer network 805 is represented by an on-site local area network 820 to which one or more personal computers 825, or servers 830 are operably connected, along with one or more remote user computers 835 that are connected to the retailer network 805 through network 815. Each personal computer 825 is generally dedicated to a particular end user, such as an employee, customer, or contractor associated with the business, although such dedication is not required. The remote user computers 830 may similarly be dedicated to a particular end user associated with the business. The personal computers 825 and remote user computers 835 can be, for example, a desktop computer, laptop computer, tablet computer, smartphone, or other device having the ability to connect to local area network 820 or Internet 815 or having other synchronization capabilities. The computers of the retailer network 805 interface with retailer data system 810 across network 815. In one embodiment, the personal computers 825 and remote user computers 835 may receive instructions over network 815 from retailer data system 810 to cause them to display user interface 105, and accept user inputs to user interface 105.

Retailer data system 810 is also associated with the retail business. Retailer data system 810 may be hosted on dedicated computing infrastructure maintained by the retail business, or may be hosted by a third party in cloud computing infrastructure configured to allocate resources on-demand to the operate the retailer data system 810. Retailer data system 810 includes a web interface server 840, database 845, and integration system 850, each interconnected, for example, by back-end network 855.

Web interface server 840 includes a web server 860, and a data source server 865. Web server 840 generates and transmits the component files of user interface 105 over the network to personal computers 825 and remote user computers 835 to cause the user interface to be displayed on these computers 825, 835. Data source server 865 accesses and retrieves data from databases 845, for example using SQL commands. It does so in response to representational state transfer (REST) requests received by REST data service 870. REST data service 870 monitors and accepts incoming REST requests from networks 815, parses detected incoming requests to determine the data requested, and presents that request to the data source server 865 for retrieval. The data source server retrieves the requested information from the databases 845 and returns it to the REST data service 870. REST data service 870 generates and transmits an outgoing REST request containing the retrieved information in response to the incoming request. In one embodiment, there are one or more REST data services. In one embodiment, REST data service 870 is declaratively defined to be dedicated to a particular analysis function.

In one embodiment, database 845 includes multiple schemas or other data structures supporting activities of the retailer data system. For example, database 845 may include development environment schema 875, integration workspace schema 880, retailer schema 885, and retail science data lake 890. Development environment schema 875 stores and maintains the data and functions of development environment 315. Integration workspace schema 880 supports the operations of a workspace, and further exposes a data model to the workspace by including appropriate synonyms and permissions, as shown and described with respect to workspace schema 303. Retailer schema 885 includes data generated by a retail enterprise's data gathering systems, and made available for access in the workspace. Retail science data lake 890 stores various structured and unstructured data, including data processing tools, in a Hadoop environment, as shown and described with respect to data lake 325. In one embodiment, data lake 890 serves as a source for retail science data model 307. In one embodiment, the retail data lake 890 includes pre-packaged cleansed data, aggregates, and intermediate results along with collection of diverse data science tools, each of which may be made available as part of retail science data model 307. This can enable a user to more rapidly construct custom functions and extensions.

In one embodiment, integration system 850 is configured for integration of back-end data analysis tools using schema, for example as shown and described generally herein. In one embodiment, integration system 850 includes the features of workspace 305 to integrate the various components of system 300.

Example Graphical User Interface

Figure 9:
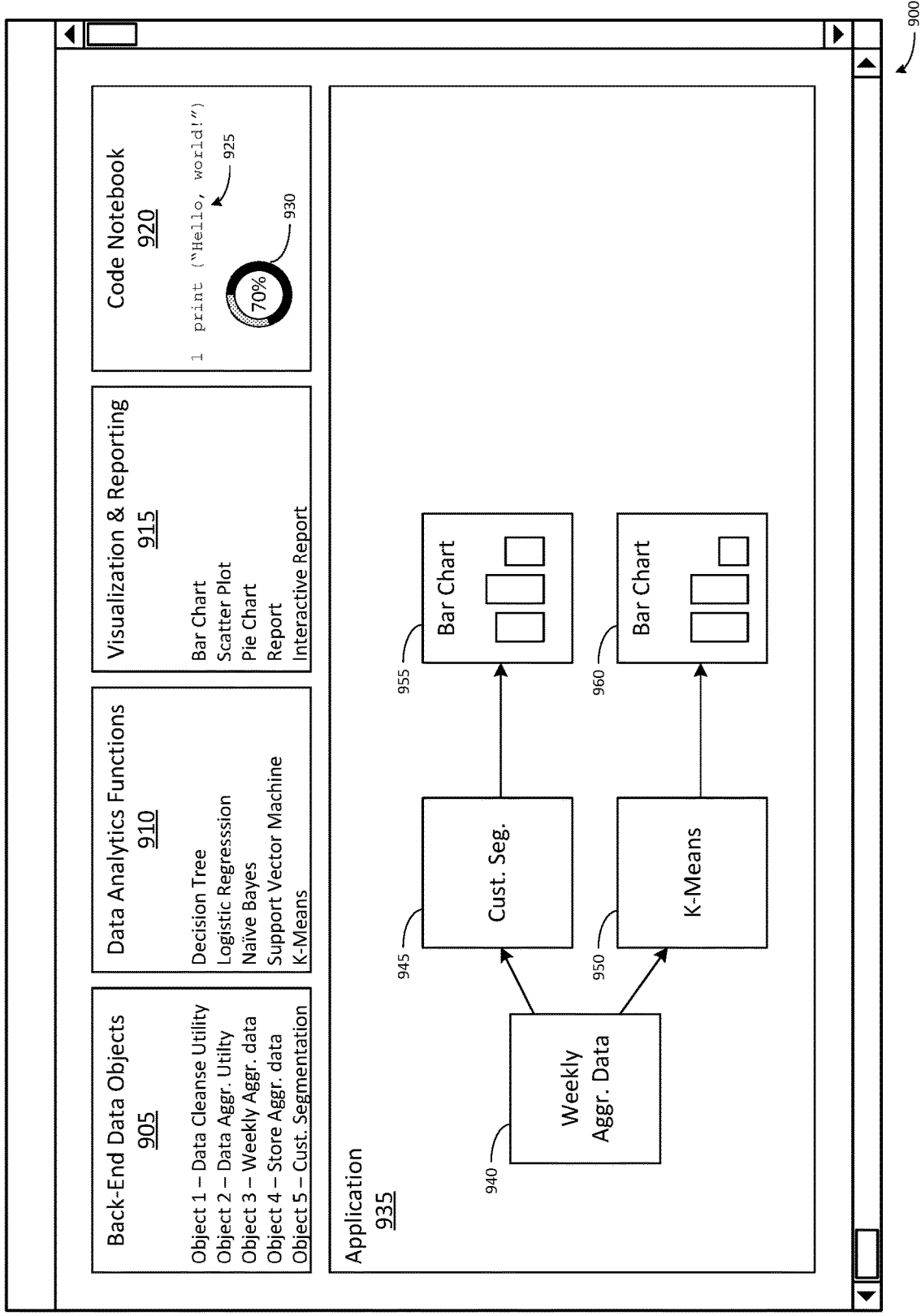
FIG. 9 illustrates one embodiment of a graphical user interface (GUI) associated with schema-based integration of back-end data analysis tools.

FIG. 9 illustrates one embodiment of a graphical user interface (GUI) 900 (such as user interface 105) associated with schema-based integration of back-end data analysis tools. GUI 900 is an illustrative example, and does not limit the form or features of systems and methods described herein. GUI 900 includes several selectable menus, such as back-end data objects menu 905, data analytics functions menu 910, and visualization & reporting menu 915. GUI 900 includes a code notebook 920 for drafting code 925 and displaying data visualizations 930 or other results.

Objects listed in the menus or the code notebook can be selected for placement into the application window 935 (for example by drag and drop) to assemble applications. For example, object icons 940 and 945 were selected from back-end data objects menu 905 and placed into application window 935. Note that in one embodiment, on selection of customer segmentation icon 945, the system ensures that all supporting data is made available to it in the workspace, for example as shown and described with reference to FIG. 2. K-means icon 950 was selected from Data analytics functions menu 910. Properties of the objects, including interconnections of inputs and outputs, may be accessed through the graphical representation of that object in the application window (see the arrows representing such selected inputs). Two copies of bar chart widget 955 and 960 are selected from visualizations and reports menu 915, and provided the outputs of the back-end customer segmentation object 945 and K-Means algorithm 950, respectively. The two visualizations 955 and 960 show the different segmentation results provided by the two different functions 945 and 950, allowing the user to see and compare the results. These results may further be shared through restful services by declaratively creating a restful service for the results (a function accessed for example by right clicking the icons for the functions 945 and 950, or by selecting a "create REST service" option from a menu (not shown).

Selected Use Cases

The systems and methods described herein that implement a platform for integrating schema and back-end retail analysis tools can be used by data scientist or business analyst users to further integrate tools as described in the following example use cases. These are few examples of business cases that retailer can extend or develop from scratch using the platform. The systems and methods described herein are not limited to these examples.

1. Customer Analytics—Customer Behavior Analysis

A customer segmentation function may generate customer segments. To further extend and develop customer intelligence application, users can identify different types of questions for the application to address. For example, users can develop web applications to answer questions like 'who are prospect customers,' 'which customers are likely to churn,' and 'what are customer's sentiments?'

The platform enables the user to combine tools to answer those questions. Users can combine (a) a text query and document classification tool (such as Oracle Text) for term extraction, word and theme searching, and building sentiment analysis models of customer product reviews; and (b) use Decision Tree or Random Forest models to predict if a customer is likely to churn or stay loyal.

2. Attribute Extraction—Classifying Products Based on Images and Text

An attribute extraction function which uses machine learning to extract product attributes using product text description provided by retailer can be extended using the platform to create a hybrid approach to extract product attributes, by combining both image and text description, thus improving accuracy of predicting product labels.

Data scientists can add combine the attribute extraction function with platform-supported tools like Keras Image processing to build machine learning models combining both text and image of products for better accuracy. For image data, models can make use of a VGG pre-trained model for Keras, a convolutional neural network to process the images, and use natural language processing to mine text data.

Hybrid Models will combine neural networks of vectorized words and VGG convolutional neural networks to predict labels. This layer of neurons is a combination from both parts of the model, and is used to predict the final classification of products.

Thus, users can combine (a) image processing tools (such as Keras) with (b) natural language processing tools to build machine learning models based on both product text description provided by retailer and image of products, yielding better accuracy when extracting product attributes than extractions using only product text description.

3. Affinity Analysis Visualization Using Notebook Graph Query Language

Using the notebook, business analysts can visualize Market Basket Analysis by using property graph query language (PGQL). Thus, users can combine (a) affinity analysis of customer-linked transaction data to identify how each product appearing in the same basket of the same buyer is linked to the other products; and (b) property graph query language visualization functions to highlight, zoom and apply filters on products and view nodes in the graphs as product in the shopping basket and each rule from product to product as an edge of the graph; thereby revealing insights such as customers buy organic coffee, they are likely to buy organic creamer, organic sugar, organic milk, etc.

4. Applying Deep Learning to Time Series Forecasting Using Notebook Tensor Flow Time series forecasting is non-trivial, particularly with long series, noisy data, and multiple input variables. Deep learning methods can improve time series forecasting, such as the automatic learning of time-based dependence and the automatic handling of trends and seasonality. Neural Networks like Long Short-Term Memory (LSTM) are well-suited for classification, processing and making predictions based on time series data for retailer.

LSTM not only overcomes classical linear methods difficulties to adapt to multivariate or multiple input forecasting problems, but also support predicting multiple time steps into the future. Such deep learning networks can be used where sales data for product like shampoo, toothpastes becomes available each month and can be used in predicting forecast for the following month, automatically learn and generate multi step forecast.

Thus, users can apply (a) a neural network such as long short-term memory (LSTM) to (b) a retailer's multivariate time-series sales data to automatically learn and generate a multiple-time-step sales forecast, overcoming the difficulties experienced by classical linear methods in resolving multivariate or multiple input forecasting problems and in predicting more than a single time-step ahead.

5. Customer Journey Analytics—Using Platform—Data Lake

Customers can use different channels like mobile, social media and e-commerce to shop with retailers, provide feedback, and do comparison shopping. These activities drive customer behavior regarding what they purchase, where they buy, and at what price they buy. Purchase behavior-driven insights can help a retailer understand a customer's journey across channels, enabling the retailer to devise better offers and present seamless experiences across channels that reflect the customer's history, preferences, and interests.

The platform may be configured with Big Data inputs. Users can (a) ingest unstructured data like customer clickstream information into an unstructured data repository (such as Hadoop); and (b) apply various tools to analyze the unstructured data for new pattern and insights, such as clickstreams that indicate high-value customers, how to improve shopping cart conversion, what online recommendations to offer, etc.

Collaboration Features

In one embodiment, the platform includes supplementary tools for team collaboration, source control, management, and deployment. For example, the platform may include a project governance tool to track features, bugs, milestones, and feedback features, thus helping analyst and developers to have effective communication and reporting. The project governance tool allows analysts data scientists and other users to generate, annotate reports and share insights among the team to collaborate and provide feedback.

The systems and methods described herein provide not just a reporting tool, but a low-code development platform that enables a user to build scalable, secure apps, which can be deployed/viewed right alongside pre-built tools to enable comparison. Further, the pre-built tools can be integrated into the user-created apps. This not only enables a user to perform reporting but also to build custom user interfaces from scratch to gain insights. Because the workspace can be shared with other users, the tool creation and attendant insight gain may be collaborative across multiple users.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Cloud System and Enterprise Embodiments

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the present system is a centralized server-side application that provides at least the functions disclosed herein and that is accessed by many users via computing devices/terminals communicating with the computing system (functioning as the server) over a computer network.

Computing Device Embodiment

Figure 10:
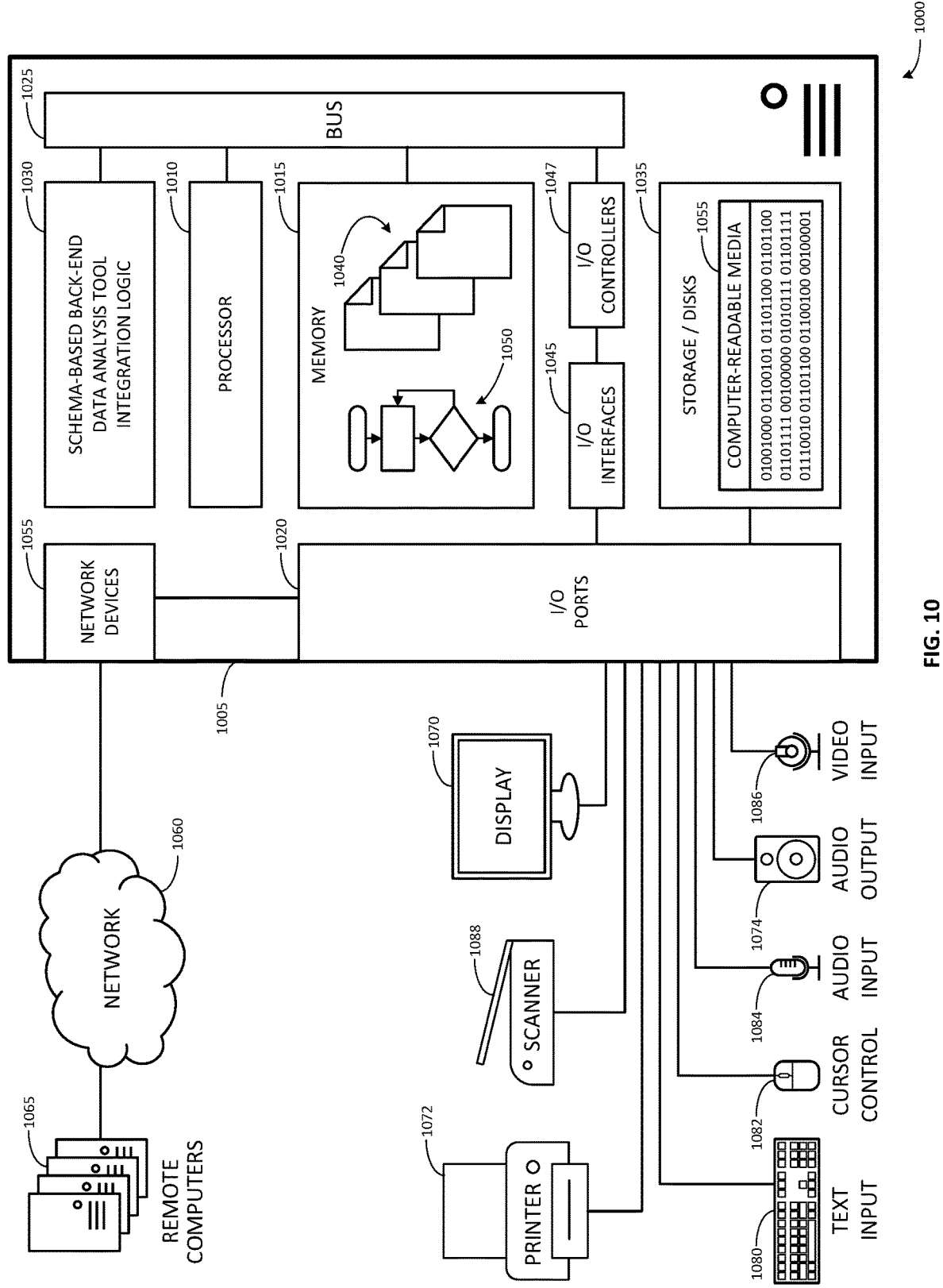
FIG. 10 illustrates an example computing device that is configured and/or programmed with one or more of the example systems and methods described herein, and/or equivalents.

FIG. 10 illustrates an example computing device 1000 that is configured and/or programmed with one or more of the example systems and methods described herein, and/or equivalents. The example computing device may be a computer 1005 that includes a processor 1010, a memory 1015, and input/output ports 1020 operably connected by a bus 1025. In one example, the computer 1005 may include Schema-based Back-End Data Analysis Tool Integration Logic 1030 configured to facilitate integration of schema and back-end retail data analysis tools, similar to logic and systems shown in FIGS. 1 through 9. In different examples, the logic 1030 may be implemented in hardware, a non-transitory computer-readable medium with stored instructions, firmware, and/or combinations thereof. While the logic 1030 is illustrated as a hardware component attached to the bus 1025, it is to be appreciated that in other embodiments, the logic 1030 could be implemented in the processor 1010, stored in memory 1015, or stored in disk 1035. In one embodiment, logic 1030 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, laptop, tablet computing device, and so on.

The means may be implemented, for example, as an ASIC programmed to implement a platform for schema-based integration of back-end data analysis tools. The means may also be implemented as stored computer executable instructions that are presented to computer 1005 as data 1040 that are temporarily stored in memory 1015 and then executed by processor 1010.

Logic 1030 may also provide means (e.g., hardware, non-transitory computer-readable medium that stores executable instructions, firmware) for implementing a platform schema-based integration of back-end data analysis tools.

Generally describing an example configuration of the computer 1005, the processor 1010 may be a variety of various processors including dual microprocessor and other multi-processor architectures. A memory 1015 may include volatile memory and/or non-volatile memory. Non-volatile memory may include, for example, ROM, PROM, and so on. Volatile memory may include, for example, RAM, SRAM, DRAM, and so on.

A storage disk 1035 may be operably connected to the computer 1000 via, for example, an input/output (I/O) interface (for example, card, device) 1045 and an input/output port 1020. The disk 1035 may be, for example, a magnetic disk drive, a solid-state disk drive, a floppy disk drive, a tape drive, a Zip drive, a flash memory card, a memory stick, and so on. Furthermore, the disk 1035 may be a CD-ROM drive, a CD-R drive, a CD-RW drive, a DVD ROM, and so on. The memory 1015 can store a process 1050 and/or a data 1040, for example. The disk 1035 and/or the memory 1015 can store an operating system that controls and allocates resources of the computer 1005.

The computer 1005 may interact with input/output (I/O) devices via the I/O interfaces 1045 and the input/output ports 1020. Input/output devices may be, for example, a keyboard 1080, a microphone 1084, a pointing and selection device 1082, cameras 1086, video cards, displays 1070, scanners 1088, printers 1072, speakers 1074, the disk 1035, the network devices 1055, and so on. The input/output ports 1020 may include, for example, serial ports, parallel ports, and USB ports.

The computer 1005 can operate in a network environment and thus may be connected to the network devices 1055 via the I/O interfaces 1045, and/or the I/O ports 1020. Through the network devices 1055, the computer 1005 may interact with a network 1060. Through the network 1060, the computer 1005 may be logically connected to remote computers 1065. Networks with which the computer 1005 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
GUI: graphical user interface.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
   generating and displaying a graphical user interface including one or more selectable generic options that indicate functions of a data system that may be selected for integration with other functions;
   receiving a selection of a plurality of data analysis functions from among the selectable generic options;
   receiving user selections that assemble an application in an application window of the graphical user interface, wherein the application is assembled to create a hybrid approach to extract product attributes that combines both image and text description, and wherein the application includes one of the selected data analysis functions;
   translating the selected data analysis functions into pre-configured commands for a plurality of back-end tools for performing the selected data analysis functions based on a mapping between the selected data analysis function and the pre-configured commands, wherein the pre-configured commands back-end data sets through synonyms for fields of the back-end data sets;
   executing the preconfigured commands to create the synonyms;
   executing the selected data analysis function on the synonyms for the fields of the back-end data from the plurality of back-end tools and generate a data analysis result of the combined functionality of the data analysis functions; and
   creating a restful service definition for the data analysis result that shares the data analysis result to other processes.

2. The computer implemented method of claim 1, further comprising:
   receiving a selection of a second data analysis function;

receiving a selection describing a combination of the data analysis function and the second data analysis function; and executing the second data analysis function in relation to the data analysis function in accordance with the described combination in order to perform a combined functionality of the data analysis functions.

3. The computer implemented method of claim 1, further comprising:

receiving a selection of a code editor;

receiving an entry of software code to create a second function;

receiving a selection describing a combination of the data analysis function and the second function; and executing the second function in relation to the data analysis function in accordance with the described combination in order to perform a combined functionality of the data analysis function and the second function.

4. The computer-implemented method of claim 1, further comprising:

receiving a selection of a visualization function;

receiving a selection describing a combination of the data analysis function and the visualization function; and executing the visualization function in relation to the data analysis function in accordance with the described combination to display a result of the data analysis function.

5. The computer-implemented method of claim 1, further comprising:

receiving a selection of a report function;

receiving a selection describing a combination of the data analysis function and the report function; and executing the report function in relation to the data analysis function in accordance with the described combination to generate a report describing a result of the data analysis function.

6. The computer-implemented method of claim 1, wherein the back-end data sets are retail-specific data that include aggregate retail data.

7. A non-transitory computer-readable medium storing computer-executable instructions that, when executed by at least a processor of a computer, cause the computer to:

generate and display a graphical user interface including one or more selectable generic options that indicate functions of a data system that may be selected for use with other functions;

receive a selection of a data analysis function from among the selectable generic options;

receive user selections that assemble an application in an application window of the graphical user interface, wherein the application is assembled to display affinities between products in a basket as a graph, and wherein the application includes the selected data analysis function;

translate the selected data analysis function into pre-configured commands for a plurality of back-end tools for performing the selected data analysis function, wherein the pre-configured commands identify and access specific schema with a compatible format for reading the specific schema from each of the plurality of back-end tools to expose back-end data sets through synonyms for fields of the back-end data sets;

execute the preconfigured commands to create the synonyms;

execute the selected data analysis function on the synonyms for the fields of the back-end data sets from the plurality of back-end tools and generate a data analysis result; and create a restful service definition for the data analysis result that shares the data analysis result to other processes.

8. The non-transitory computer readable medium of claim 7, wherein the instructions further cause the computer to:

receive a selection of a second data analysis function;

receive a selection describing a combination of the data analysis function and the second data analysis function; and execute the second data analysis function in relation to the data analysis function in accordance with the described combination in order to perform a combined functionality of the data analysis functions.

9. The non-transitory computer readable medium of claim 7, wherein the instructions further cause the computer to:

receive a selection of a code editor;

receive an entry of software code to create a second function;

receive a selection describing a combination of the data analysis function and the second function; and execute the second function in relation to the data analysis function in accordance with the described combination in order to perform a combined functionality of the data analysis function and the second function.

10. The non-transitory computer readable medium of claim 7, wherein the instructions further cause the computer to:

receive a selection of a visualization function;

receive a selection describing a combination of the data analysis function and the visualization function; and execute the visualization function in relation to the data analysis function in accordance with the described combination to display a result of the data analysis function.

11. The non-transitory computer readable medium of claim 7, wherein the instructions further cause the computer to:

receive a selection of a report function;

receive a selection describing a combination of the data analysis function and the report function; and execute the report function in relation to the data analysis function in accordance with the described combination to generate a report describing a result of the data analysis function.

12. The non-transitory computer readable medium of claim 7, wherein the back-end data sets include retail-specific data that is at least one of cleansed retail data, and aggregate retail data.

13. The non-transitory computer readable medium of claim 7, wherein the data analysis function is a machine learning algorithm.

14. A computing system comprising:

a processor;

a memory operably connected to the processor;

a non-transitory computer-readable medium operably connected to the processor and memory and storing computer-executable instructions that when executed by at least a processor of a computer cause the computer to:

generate and display a graphical user interface including one or more selectable generic options;

receive a selection of a data analysis function from among the selectable generic options;

receive user selections that assemble an application in an application window of the graphical user interface, wherein the application is assembled to create a hybrid approach to extract product attributes that combines both image and text description, and wherein the application includes the selected data analysis functions;

translate the selected data analysis function into pre-configured commands for a plurality of back-end tools for performing the selected data analysis function based on a mapping between the selected function and the pre-configured commands, wherein the pre-configured commands identify and access specific schema with a compatible format for reading the specific schema from each of the plurality of back end-tools to expose retail-specific back-end data sets through synonyms for fields of the back-end data sets;

execute the preconfigured commands to create the synonyms for retrieving corresponding retail-specific data from the plurality of the back-end tools;

execute the selected data analysis function on the synonyms for the fields of the retail-specific back-end data sets from the plurality of back-end tools and generate a data analysis result; and create a restful service definition for the data analysis result that shares the data analysis result to other processes.

15. The computing system of claim 14, wherein the retail-specific back-end data sets includes cleansed retail data.

16. The computer implemented method of claim 1, further comprising receiving user selections that assemble an application to predict whether a customer is likely to churn in the application window of the graphical user interface, wherein the application includes the data analysis function.

17. The non-transitory computer readable medium of claim 7, wherein the instructions further cause the computer to receive user selections that assemble an application to create a hybrid approach to extract product attributes that combines both image and text description in the application window of the graphical user interface.

18. The computer implemented method of claim 1, further comprising receiving user selections that assemble an application to display affinities between products in a basket as a graph in the application window of the graphical user interface.

19. The computer implemented method of claim 1, further comprising receiving user selections that assemble an application to produce a multiple time-step sales forecast in the application window of the graphical user interface, wherein the application includes the data analysis function.

20. The computer implemented method of claim 1, further comprising receiving user selections that assemble an application to ingest customer clickstream information and identify clickstreams that indicate high-value customers in the application window of the graphical user interface, wherein the application includes the data analysis function.

* * * * *